United States Statutory Invention Registration [19]

[11] Reg. Number: H913

Hershkowitz

[43] Published: May 7, 1991

[54] EXPLOSIVE DEVICES FOR FOXHOLE MANUFACTURE, DEMOLITION AND URBAN WARFARE

[75] Inventor: Joseph Hershkowitz, W. Caldwell, N.J.

[73] Assignee: The United States of America as represented by the Secretary of the Army, Washington, D.C.

[21] Appl. No.: 396,499

[22] Filed: Aug. 17, 1989

[51] Int. Cl.[5] ..... F42B 1/02

[52] U.S. Cl. ..... 102/307; 102/309

[58] Field of Search ..... 102/307, 309

[56] References Cited

U.S. PATENT DOCUMENTS

| | | | |
|---|---|---|---|
| 4,537,132 | 8/1985 | Sabranski | 102/307 |
| 4,672,896 | 6/1987 | Precoul et al. | 102/309 |
| 4,711,181 | 12/1987 | Ringel et al. | 102/309 X |
| 4,776,278 | 10/1988 | Scholles et al. | 102/307 |
| 4,856,430 | 8/1989 | Gibb et al. | 102/307 |

*Primary Examiner*—Stephen J. Lechert, Jr.
*Attorney, Agent, or Firm*—Anthony T. Lane; Edward Goldberg; Michael C. Sachs

[57] ABSTRACT

Explosive devices for foxhole manufacture, demolition and urban warfare. The devices comprise a hollow metal cylinder; a cap at the top end closing said metal liner, said cap having a waveshaper on the interior thereof, and said cap having a hole therethrough for insertion of an ignition charge; a closure at the bottom end of said liner, said closure having the form of a liner, depressed inwardly; and an explosive composition disposed within the metal liner between the waveshaper of said cap and the depressed cone of said closure. An alternative explosive device is disclosed wherein the closure at one end of the metal cylinder is spaced apart and inwardly from the open end of said line to form a standoff space. A further explosive device is disclosed wherein additional explosive is disposed within the standoff space but leaving spaces for jet formation.

14 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

(a) Standoff = 0.75 CD (b) Standoff = 1.0 CD (c) Standoff = 2.0 CD (d) Standoff = 3.0 CD FIG. 4A
a. Surface Burst
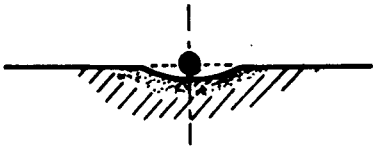
FIG. 4B
b. Shallow Burial
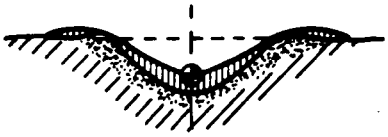
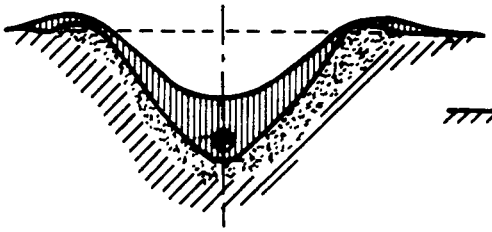
FIG. 4C
c. Optimum Burial Depth
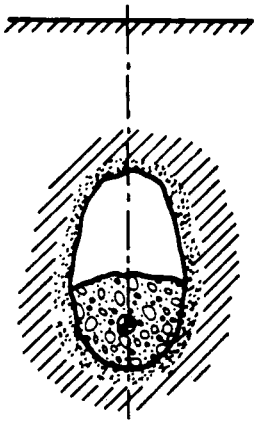
FIG. 4E
e. Very Deep Burial
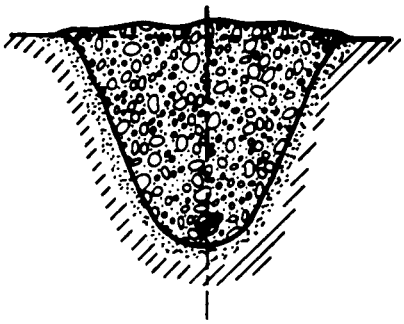
FIG. 4D
d. Deep Burial
LEGEND
- Charge Location
- Rupture Zone
- Undisturbed Material
- Fallback And Ejecta
- Disturbed And Displaced Material FIG. 7B
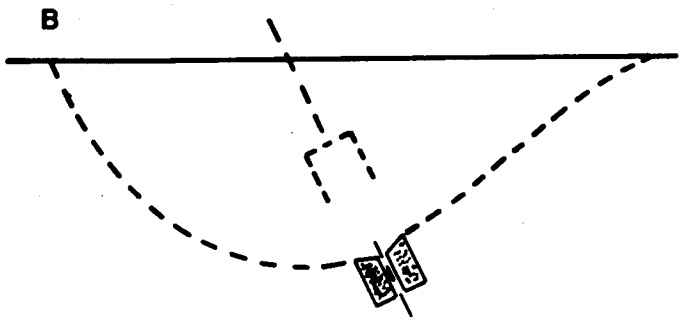
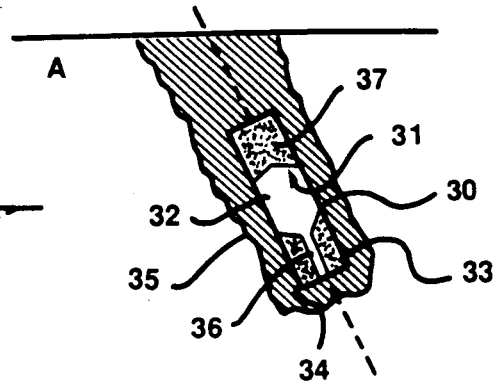
FIG. 7C
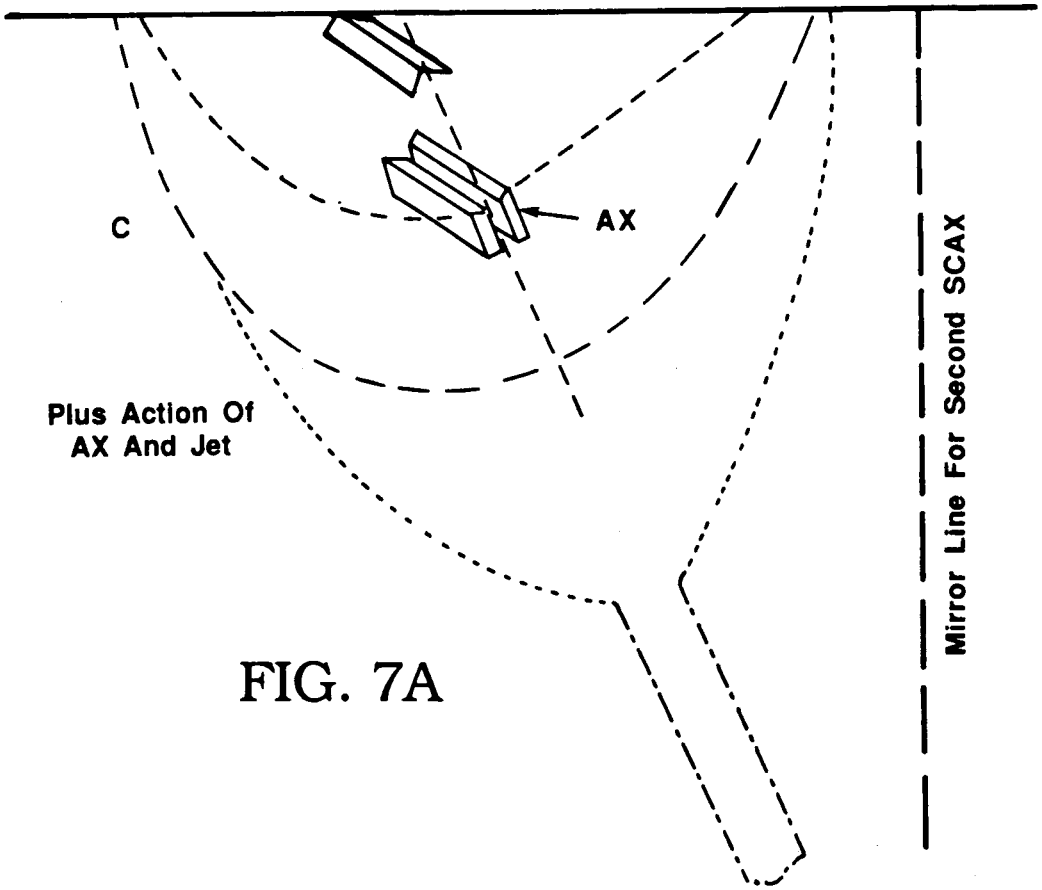
FIG. 7A

EXPLOSIVE DEVICES FOR FOXHOLE MANUFACTURE, DEMOLITION AND URBAN WARFARE

GOVERNMENTAL INTEREST

The invention described herein was made in the course of or under a contract or subcontract thereunder with the Government and may be manufactured, used and licensed by or for the Government for Governmental Purposes without the payment to me of any royalties thereon.

BACKGROUND OF THE INVENTION

The field of the invention pertains to explosive devices for foxhole manufacture, for demolition and for urban warfare. More particularly, the invention is directed to the use of a shaped charge ("SC"), and as modified by additional explosives placed in part of the stand-off region ("SCAX") The SCAX devices are used as an explosive foxhole device ("EXFOD") singly or in combination by placement in "pre-dig" holes with backfilling and stemming. The SCAX devices are also suitable for urban warfare and for expedient demolition tests.

In the prior art, an SC generates an explosive jet and a following slug as the SC liner is collapsed by the surrounding explosive. The jet is a strong, well defined stream of liquid-state metal formed from the liner of the SC. As the SC liner is collapsed by the explosive, the slug is also formed, which is the mass of relatively, slow moving part of the collapsed metal liner.

For EXFOD use, there can be a one-step or two-step explosive device with one-step desirable. The total time to emplace, fire and excavate for EXFOD is desired to be less than ten (10) minutes. This time is to include final shaping and removal of loose soil with an entrenching tool.

In working with and firing of explosives, the essence of safe use has always been slow, careful, deliberate, preplanned-in-detail operations utilizing protective or remote handling devices. Combat conditions leading to simultaneous entrenchment under fire by many soldiers represents the very antithesis of the way explosive devices should be handled. Every soldier would have to be clear of the area before a single EXFOD could be fired. If any incorporated delay were used as part of each EXFOD to provide time to clear the area, one malfunctioning delay could lead to significant casualties. The time to safely entrench would have to be set by the slowest soldier. A two-step EXFOD process seriously compounds the safety problems. It would require clearing the area twice, once for the SC (to provide holes to place cratering charges) and again for the cratering charge, which would require an emplacement. If the first step of any one such EXFOD involved a malfunction, reentry into the area for the second step could be hazardous. Hand-emplacement of the cratering charges would be underway simultaneously by many soldiers. If one charge accidentally or prematurely exploded, considerable casualties could result. Under combat conditions and with a total time of about ten minutes for all the soldiers to achieve the required fox holes, a two-step EXFOD is exceedingly difficult to achieve and would probably lead to an unsafe munition to use.

SUMMARY OF THE INVENTION

It is an object of the present invention, therefore, to provide novel explosive devices for one-step use as a safe munition.

Another object of the present invention is to provide explosive devices suitable for generation of a hole in concrete, rock and earth; which is suitable for foxhole manufacture, demolition and urban warfare.

These and other objects not enumerated are achieved in the present invention by an explosive device for foxhole manufacture, demolition and urban warfare comprising: a hollow metal cylinder; a cap at one end of said cylinder, closing said cylinder, and having an explosion waveshaper on the interior thereof, with a hole through the cap for insertion of an ignition charge therein; a closure at the other end of said cylinder, in the form of a cone depressed inwardly, constituting the SC liner; and an explosive composition disposed within said cylinder between said waveshaper and said SC liner.

BRIEF DESCRIPTION OF THE DRAWINGS

A more complete understanding of the explosive devices of the present invention may be had from the following detailed description thereof, particularly when read in the light of the accompanying drawings, wherein:

FIG. 4 is a side sectional view of crater profiles as a function of variable depth for the same weight of charge.

FIG. 6 is the one-step munition concept using two SC tamped with standoffs into pre-digs;

FIG. 7 is a side sectional view of crater contributions from one SCAX with a "mirror line" shown to add action of a second SCAX;

DETAILED DESCRIPTION OF THE PREFERRED EMBODIMENT

Figure 1:
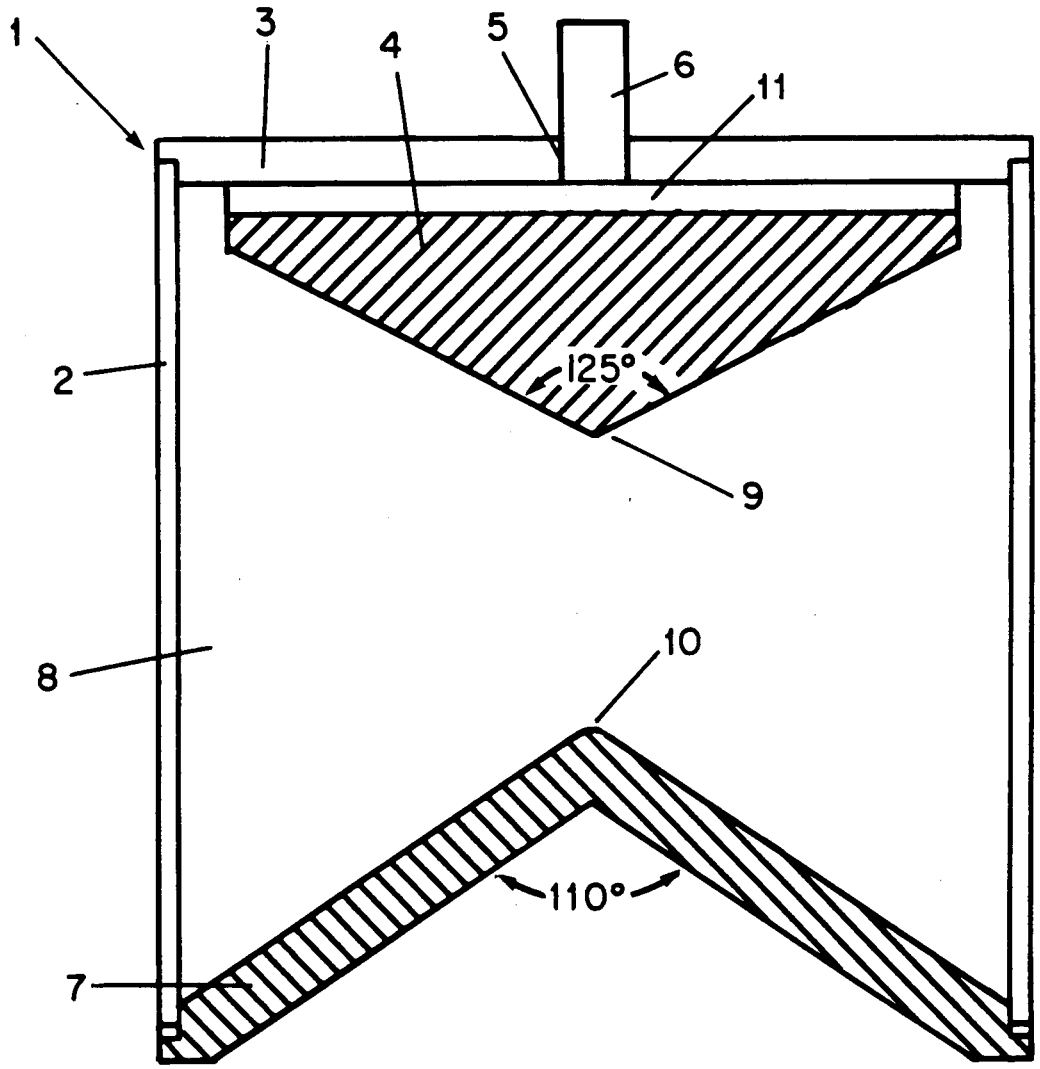
FIG. 1 is a side sectional view of an SC.
Figure 2A:
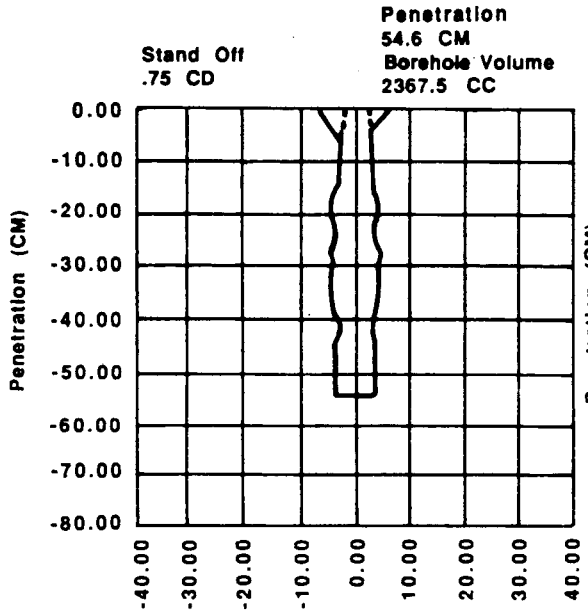
FIG. 2 is a graphic summary of the results of penetration and hole profiles using the SC at various standoffs.
Figure 2B:
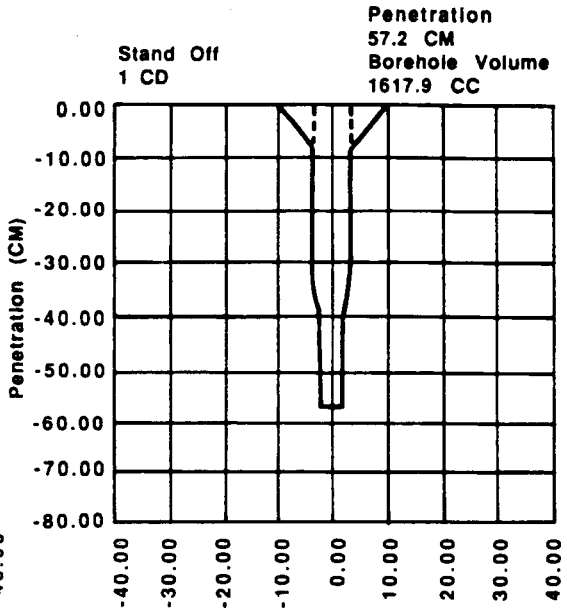
Figure 2C:
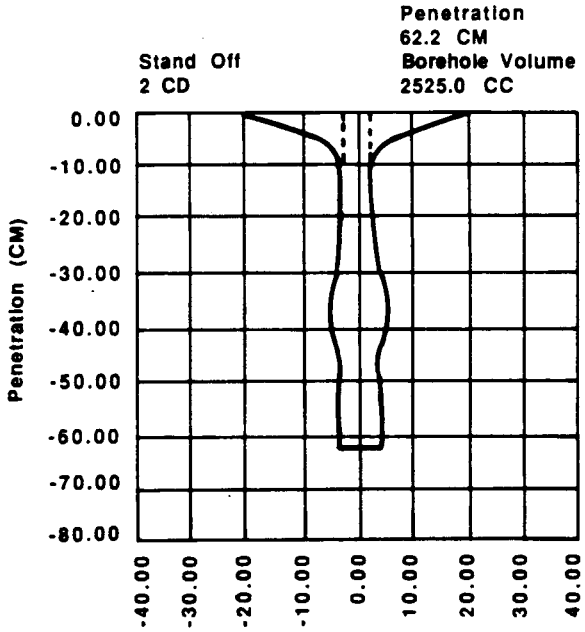
Figure 2D:
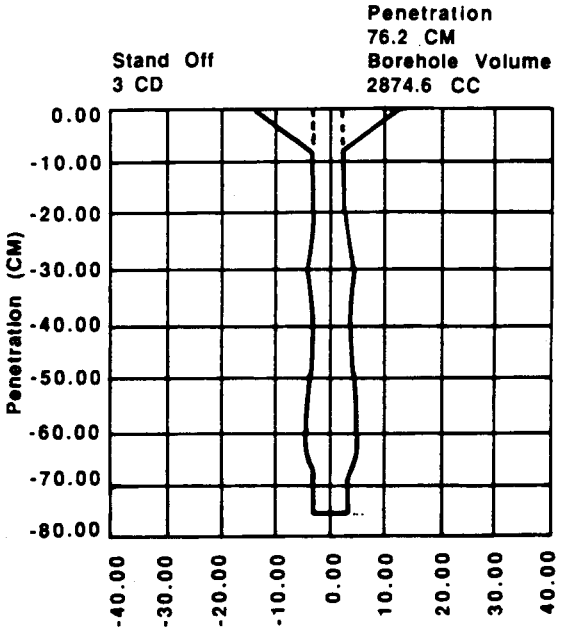

A preferred embodiment of an SC explosive device of the present invention is best described in the context of FIG. 1 as follows:

The SC is generally designated 1, comprising a cylindrical hollow aluminum cylinder 2 about 3.44 inches long with an acrylic cap 3 at one end. Said cap 3 has a data sheet explosive 11 disposed internally under said cap 3, said data sheet explosive 11 is covered internally by a foam waveshaper 4, which has the form of a cone with an included point angle of about 125° protruding into the interior of the liner 2. Said cap 3 has a perforation 5 at the center thereof for placement of an initiator explosive 6 to set off the data sheet explosive 11 as directed by the munitions handler by a spark, fuze, electrical contact, etc. At the other end of said cylinder 2 is an aluminum shaped charge liner (the SC liner) in the form of an internally disposed cone with an included point angle of about 110° protruding inwardly within said hollow cylinder 2 so as to be axially opposite the point of said waveshaper cone 4 on said cap 3 at the other end of the hollow cylinder 2. Said aluminum shaped charge liner 7 has a thickness of about 6% of the charge diameter, or about 0.21 inches with a rating of 1100 H. Between said waveshaper 4 and said liner 7, there is disposed a composition B explosive 8 within said hollow cylinder 2.

The SC shown in FIG. 1 is suitable for generation of a hole in concrete, rook and earth The SC penetration and hole profile in concrete is a function of standoff for perpendicular to the surface incidence, i.e., when the SC is detonated at a distance from the surface upon which the explosive charge is placed.

FIG. 2 is a graphic summary of the results of penetration and hole profile at various standoffs for conical SC liners. The standoffs are varied on the basis of the cone diameter (CD) of the cone closure 7). The results in FIG. 2 are for (a) 0.75 CD standoff; (b) 1.0 CD standoff; (c) 2.0 CD standoff; and (d) 3.0 CD standoff.

Figure 3:
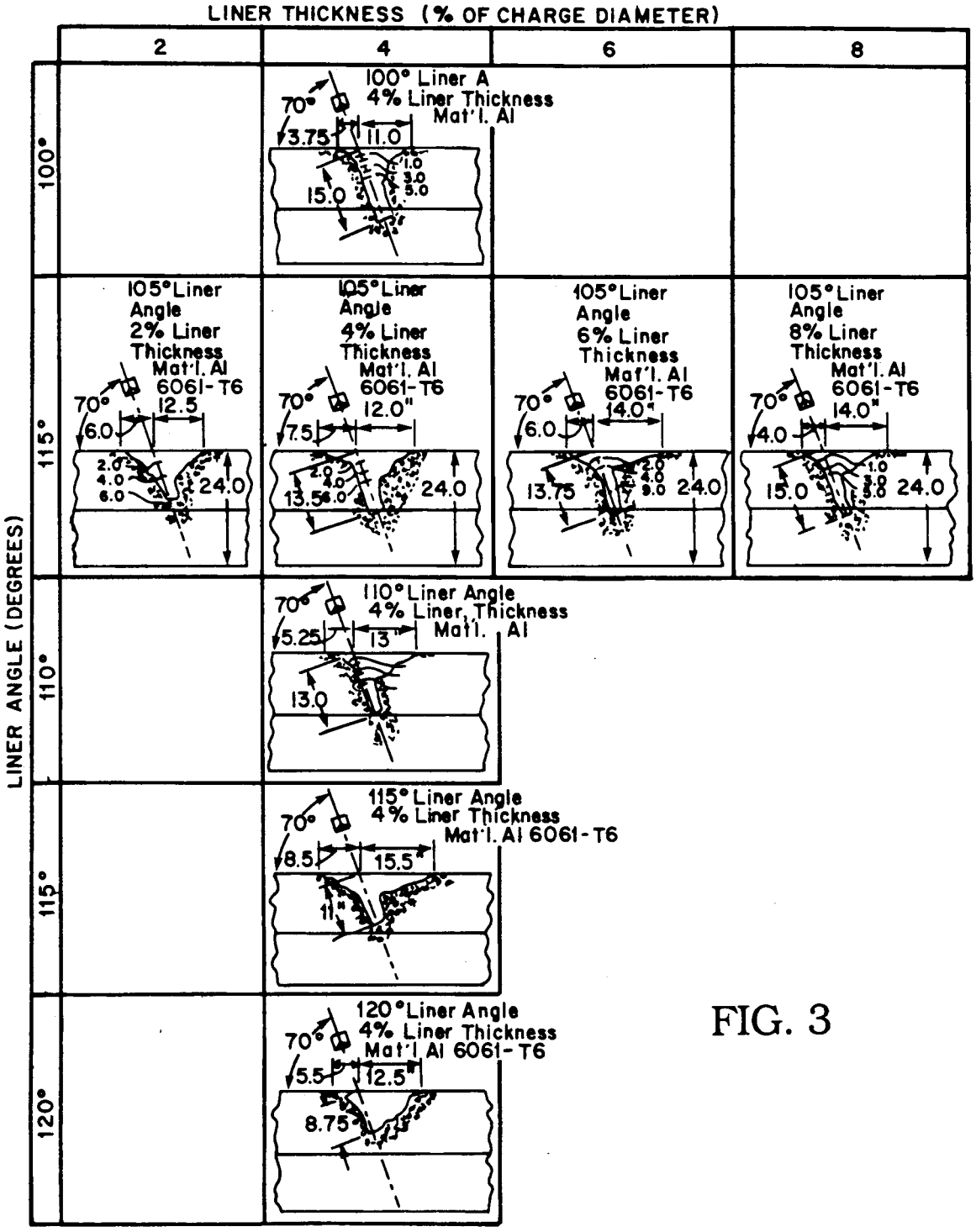
FIG. 3 is a graphic summary of the results of liner angle and SC liner thickness variations with an SC.

Referring now to FIG. 3, there is shown a graphic summary of the crater results achieved by varying the conical liner by liner angle (degrees) by liner thickness (percent of charge diameter).

Referring now to FIG. 4, the use of a cratering charge forming crater profiles upon explosion is shown for (a) surface burst, (b) shallow burial, (c) optimum burial depth, (d) deep burial, and (e) very deep burial.

Figure 5:
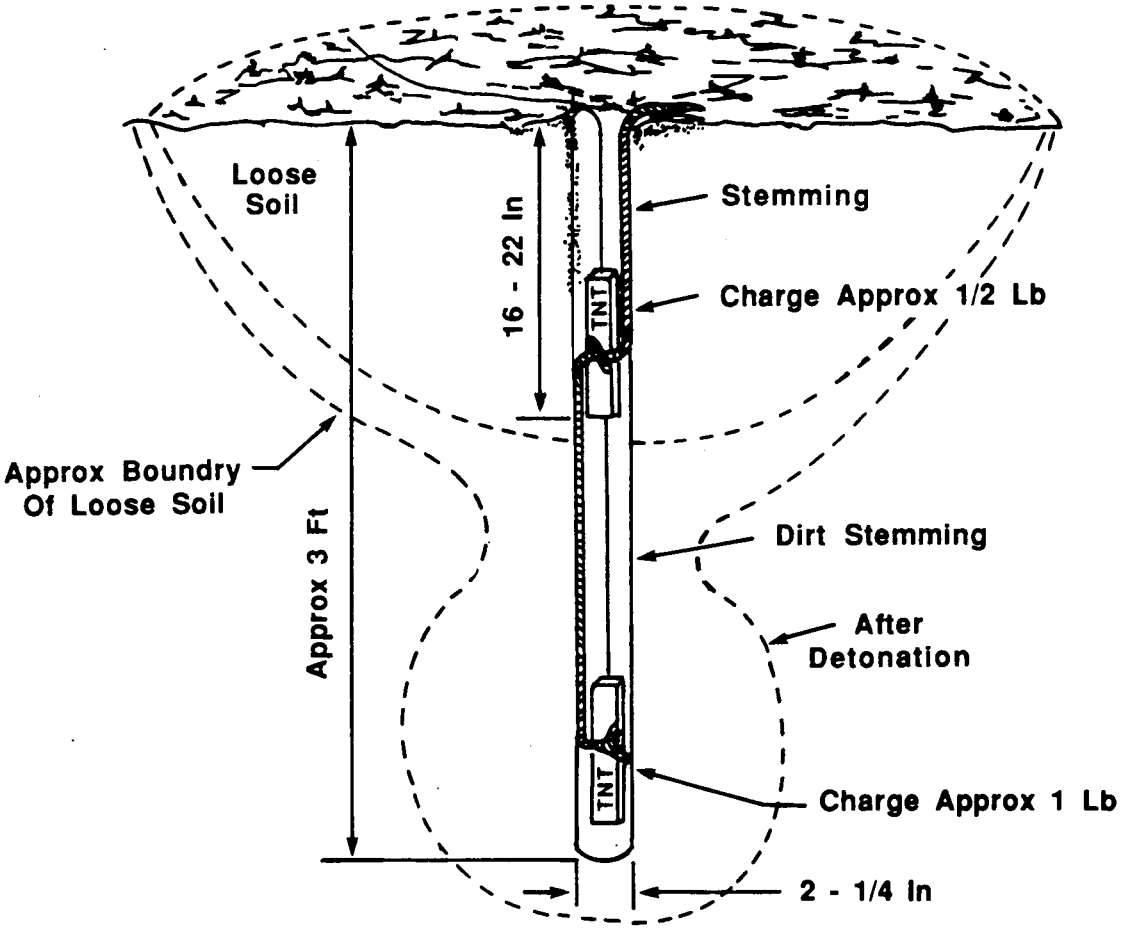
FIG. 5 is a side sectional illustration of a two-charge foxhole.
Figure 8A:
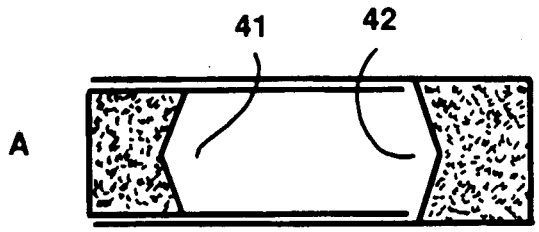
FIG. 8 shows additional explosives to be used with the SC in various packaging considerations.
Figure 8B:
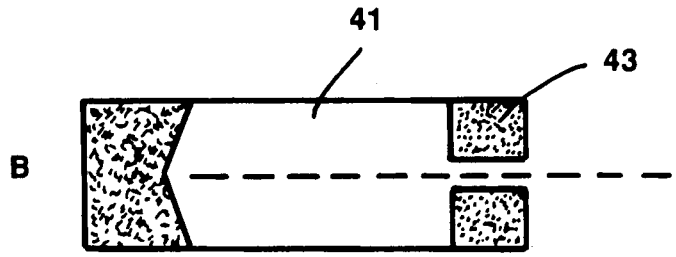
Figure 8C:
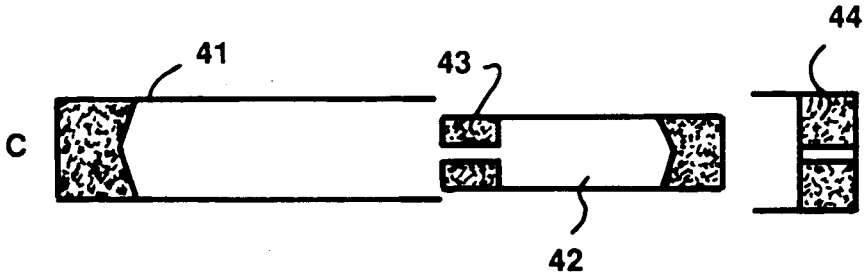
Figure 8D:
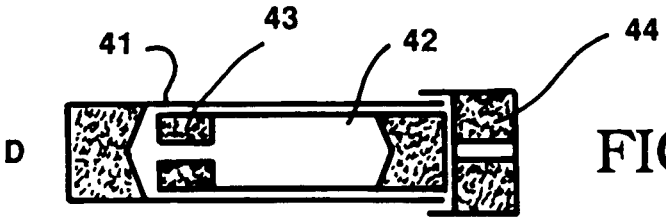

Referring now to FIG. 5, here is shown the illustration of a two-charges cratering foxhole manufacture.

Referring now to FIG. 6, there are shown a use of two SC's, 21, 22, set with standoffs 23, 24, respectively, which are formed and tamped into pre-digs, 25, 26, respectively. As shown at A of FIG. 6, the result of simultaneous explosion results in a smooth bottom crater. When the two SC's 21, 22 are as shown in B and are functioned sequentially in explosion, by primacord as shown at B of FIG. 6, the resultant crater is shallow and asymmetrical.

The action of the SC can be considerably improved for EXFOD by the addition of explosive into part of the standoff space. The cone collapse into a jet essentially occurs within the first cone diameter of standoff. In the remaining standoff distance, the jet lengthens. This improvement is obtained by placing explosive in the aforementioned remaining standoff space essentially, but not necessarily limited to the region beyond the first cone diameter of standoff as shown at A of FIG. 7. The SC 30 has a standoff space 32 that is partially packed with additional explosive 33, out to the cylindrical hollow cylinder 34 of the SC 30 (occupying about ⅓ of the total length, so allowing space for the jet to form. The SC 30 with the additional explosive added thereto as shown in A of FIG. 7 is termed a shaped charge with additional explosive (SCAX). The SCAX, generally termed 35, is also provided with a hole 36 through the additional explosive 33 so that the jet generated from the explosive can pass freely through the additional explosive 33. Auxiliary means can be added (e.g., primacord to the SC explosive) so as to provide delayed ignition of the additional explosive 33 following the jet passage therethrough, or the ignition of the additional explosive 33 can be by the jet of passing through the hole 36 in the additional explosive 33, or can be by a selected-explosive insert in the jet path in the hole 36 designed to produce initiation of the additional explosive 33 subsequent to the jet passage therethrough. The SCAX 35 may be used by passage of the jet without ignition of the additional explosive 33, or by ignition of the additional explosive, or by slug action to provide initiation, as shown at B of FIG. 7.

SC geometries are preferably conical liners. However, linear SC cutting charges can also be utilized as shown at C of FIG. 7. Point as well as peripheral munition SC designs are also encompassed. The SCAX as shown in FIG. 7 is superior to an SC because: (a) the added explosive 33 is of low density and of low strength and does not impede jet stretching; (b) the added explosive 33 provides additional cratering action as a spaced explosion from the SC explosive 37, with optimum action when the SCAX is in a pre-dig hole; (c) the action of the additional explosive 33 is stemmed by the products of the SC explosive 7; (d) the additional explosive 33 acts through the hole 36 furnished by the precursor jet; (e) the combination of jet, additional explosive 33, and SC explosive 37 provides optimum rupture and cratering for the weight of the device as all components contribute to reinforce the action of the others for the design function; and (f) an SCAX in square cross-section is superior to circular cross-section for precursor action for a one-step EXFOD (where volume limitation rather than weight limitation applies).

Referring now to FIG. 8. It is shown that two SC (at A) or two SCAX (at C) can be packaged together, and may be in cylindrical, square or rectangular cross-section. For example, the packaging of two SC 41, 42 shown at A of FIG. 8 would have a length of 12 inches overall and a square cross-section of 4 inches on the side.

An alternative embodiment is shown at B of FIG. 8 wherein an added ring 43 of explosive is added to the SC 41 to provide an SCAX. The annular ring 43 of explosive may be a solid explosive or with an insert to provide jet ignition. Another alternate embodiment is shown at C (as parts) of FIG. 8 wherein two different size SCAX have AX annular rings 43, 44, respectively, and are packaged together as a unit, as shown in D.

As can be seen from the foregoing, the SC and SCAX devices of the present invention provide effective explosive devices for foxhole manufacture, demolition and urban warfare.

While the present invention has been described with a degree of particularity, it should be understood that variations and modifications will be obvious to those skilled in the art without departing from the scope of the present invention as defined in the appended claims.

The foregoing disclosure and drawings are merely illustrative of the principles of this invention and are not to be interpreted in a limiting sense. I wish it to be understood that I do not desire to be limited to the exact details of construction shown and described because obvious modifications will occur to a person skilled in the art.

What is claimed is:

1. An explosive device for foxhole manufacture, demolition and urban warfare comprising:

a hollow cylinder;

a cap closing said cylinder at the top end, said cap having a waveshaper on the interior thereof, and said cap having a hole therethrough for insertion of an ignition charge;

a closure at the bottom end of said cylinder, said closure having the form of a cone depressed internally within said hollow liner, and constituting the shaped charge liner which provides the jet;

an explosive composition disposed within said hollow cylinder between said waveshaper and said shaped charge liner.

2. The explosive device recited in claim 1, wherein said SC liner is spaced apart and inwardly from the bottom end of said cylinder so as to form a standoff space between said SC liner and the bottom end of said follow cylinder.

3. The explosive device recited in claim 2 wherein additional explosive (AX) is contained within the standoff space, starting from approximately one diameter from the base of the SC liner.

4. The explosive device as recited in claim 3 wherein a longitudinal axial hole is provided through said additional explosive (AX) for passage of the jet.

5. The explosive device as recited in claim 3 wherein the additional explosive in the standoff space is an annular ring disposed within the metal liner at the end of the standoff space.

6. The explosive device as recited in claim 1 wherein the liner and other corresponding parts of the SCAX has a cross-section that is either circular or square or rectangular.

7. The explosive device as recited in claim 1 wherein the cone of said waveshaper has an included angle of about 125° degrees.

8. The explosive device as recited in claim 1 wherein the cone of said SC liner has an included angle of about 110°.

9. The explosive device as recited in claim 1 wherein said hollow cylinder and said SC liner are metal.

10. The explosive device as recited in claim 1 wherein said hollow cylinder and said SC liner are aluminium.

11. The explosive device as recited in claim 1 wherein said SC liner has a diameter of about 3.44 inches.

12. The explosive device as recited in claim 1 wherein said SC liner is about 0.21 inches thick.

13. The explosive device as recited in claim 1 wherein the cap is acrylic.

14. The explosive device as recited in claim 1 wherein said waveshaper was foam and data sheet explosive.

* * * * *